United States Patent
Kang

(10) Patent No.: US 12,278,397 B2
(45) Date of Patent: Apr. 15, 2025

(54) POUCH TYPE SECONDARY BATTERY AND PRODUCTION METHOD THEREOF

(71) Applicant: SK On Co., Ltd., Seoul (KR)

(72) Inventor: Hee Gyoung Kang, Daejeon (KR)

(73) Assignee: SK On Co., Ltd., Seoul (KR)

( * ) Notice: Subject to any disclaimer, the term of this patent is extended or adjusted under 35 U.S.C. 154(b) by 217 days.

(21) Appl. No.: 17/084,545

(22) Filed: Oct. 29, 2020

(65) Prior Publication Data

US 2021/0135180 A1    May 6, 2021

(30) Foreign Application Priority Data

Oct. 31, 2019 (KR) .................. 10-2019-0137381

(51) Int. Cl.
*H01M 50/531* (2021.01)
*H01M 10/0585* (2010.01)

(52) U.S. Cl.
CPC ..... *H01M 50/531* (2021.01); *H01M 10/0585* (2013.01)

(58) Field of Classification Search
CPC .......... H01M 50/531; H01M 10/0585; H01M 50/105; H01M 50/103; H01M 50/136; H01M 50/186; H01M 50/342; H01M 50/367
See application file for complete search history.

(56) References Cited

U.S. PATENT DOCUMENTS

| | | |
|---|---|---|
| 2007/0207378 A1 | 9/2007 | Mizuta |
| 2010/0233519 A1* | 9/2010 | Cheon ............... H01M 10/0431 429/56 |
| 2012/0040235 A1* | 2/2012 | Cho ................... H01M 50/538 429/185 |
| 2020/0203676 A1* | 6/2020 | Yoon .................... H01M 50/30 |
| 2020/0321577 A1* | 10/2020 | Kim ................... H01M 50/595 |

FOREIGN PATENT DOCUMENTS

| | | |
|---|---|---|
| CN | 1930701 A | 3/2007 |
| CN | 106654384 A | 5/2017 |
| CN | 108574060 A | 9/2018 |

(Continued)

OTHER PUBLICATIONS

EPO English Machine Translation of WO2018043907, originally published to Chen X on Mar. 8, 2018 (Year: 2018).*

(Continued)

*Primary Examiner* — Niki Bakhtiari
*Assistant Examiner* — Niara Trant
(74) *Attorney, Agent, or Firm* — The Webb Law Firm

(57) ABSTRACT

Provided are the system and method of molding a gas collection portion of a battery pouch, and more particularly, the system and method of molding a gas collection portion to collect gas in a portion where an electrode tab welding portion of a battery pouch is disposed. In the system and method of molding the gas collection portion of the battery pouch according to the present disclosure, the electrode tab welding portion may also be molded when the battery pouch is molded, and the gas generated in the battery cell may thus be collected in a space formed between the pouch inclined surfaces, thereby preventing or delaying venting of the battery pouch.

12 Claims, 10 Drawing Sheets

(56) References Cited

FOREIGN PATENT DOCUMENTS

| CN | 209344131 U | 9/2019 | | |
|---|---|---|---|---|
| JP | 2004303563 A | 10/2004 | | |
| JP | 4591923 B2 | 12/2010 | | |
| KR | 1020030039703 A | 5/2003 | | |
| KR | 100876254 B1 | 12/2008 | | |
| KR | 1020120013883 A | 2/2012 | | |
| KR | 1020150134673 A | 12/2015 | | |
| KR | 101601135 B1 | 3/2016 | | |
| KR | 1020170050444 A | 5/2017 | | |
| KR | 101753213 B1 | 7/2017 | | |
| KR | 20180091324 | * | 8/2018 | .......... H01M 50/105 |
| WO | WO-2018043907 A1 | * | 3/2018 | .............. H01M 2/02 |

OTHER PUBLICATIONS

EPO English Machine Translation of KR 20180091324 originally published to Kim Deouk Geun on Aug. 16, 2018 (Year: 2018).*

* cited by examiner

POUCH TYPE SECONDARY BATTERY AND PRODUCTION METHOD THEREOF

CROSS-REFERENCE TO RELATED APPLICATION

This application claims priority to Korean Patent Application No. 10-2019-0137381 filed Oct. 31, 2019, the disclosure of which is hereby incorporated by reference in its entirety.

TECHNICAL FIELD

The following disclosure relates to a pouch type secondary battery and a production method thereof, and more particularly, to a pouch type secondary battery having an expandable gas collection space, and a production method thereof.

BACKGROUND

As a portable wireless device such as a mobile phone or a laptop becomes lighter and multi-functional, there is a rapidly increasing demand for a secondary battery as its energy source. In particular, research on a lithium secondary battery having high energy density and discharge voltage has been actively conducted, commercialized and widely used. In addition, the secondary battery is spotlighted as a power source for an electric vehicle, which is proposed as a solution to environmental pollution caused by a prior gasoline vehicle, a diesel vehicle or the like, that uses a fossil fuel.

However, when the secondary battery is overcharged or short-circuited, a large amount of gas may be generated in the secondary battery. If pressure in the secondary battery is increased due to the generated gas, sealing of a battery pouch may be released and cause an explosion or fire. If a battery cell in the battery pouch includes a highly reactive material, the secondary battery may be less safe, and may have a shorter lifespan due to deterioration caused by the gas generation.

Accordingly, there has been research actively conducted on a method of preventing venting of a pouch type secondary battery or delaying occurrence of the venting due to the gas generation as much as possible by allowing the battery pouch to have a gas collection portion formed therein to collect the gas generated in the battery cell.

RELATED ART DOCUMENT

Patent Document

Japanese Patent Publication No. 4591923 (Sep. 24, 2010)

SUMMARY

An embodiment of the present disclosure is directed to providing a pouch type secondary battery capable of preventing venting of the secondary battery or delaying occurrence time of the venting by molding a battery pouch to have an additional gas collection portion having a curve allowing a surface of its predetermined portion to be stretched and thereby maximizing a space in which gas generated in a battery cell may be collected.

Another embodiment of the present disclosure is directed to providing a pouch type secondary battery capable of utilizing the most of its unsealed area by being produced to have an additional gas collection portion formed in a tab welding portion where an electrode tab welding area, which is the unsealed area, is located.

Still another embodiment of the present disclosure is directed to providing a pouch type secondary battery having a curved surface capable of collecting gas as much as possible and maintaining a predetermined shape during its expansion.

Yet another embodiment of the present disclosure is directed to providing a production method of producing such a pouch type secondary battery and a pouch case thereof.

In one general aspect, a pouch type secondary battery includes: a battery cell including a positive plate, a negative plate, a separator, and positive and negative electrode tabs that protrude; and a pouch case having the battery cell disposed therein, wherein the pouch case includes: a battery cell accommodation space accommodating the battery cell; a sealing portion formed by sealing the pouch case around an outer periphery of the battery cell accommodation space; a tab welding surface formed in a portion where the positive electrode tab and the negative electrode tab are disposed inside the sealing portion and the pouch case is not sealed; and a pouch inclined surface formed between the battery cell accommodation space and the tab welding surface, and the tab welding surface is wrinkled by being molded to have a predetermined curve.

The predetermined curve of the tab welding surface may be formed in a shape of a curved or bent surface having a predetermined curvature.

The curved or bent surface of the tab welding surface may be formed in a fractal shape in which a curved or bent surface of a smaller pitch is repeated.

The pouch inclined surface may be wrinkled by being molded to have a predetermined curve.

The predetermined curve of the pouch inclined surface may be formed in a shape of a curved or bent surface having a predetermined curvature.

The curved or bent surface of the pouch inclined surface may be formed in a fractal shape in which a curved or bent surface of a smaller pitch is repeated.

In another general aspect, a production method of a pouch type secondary battery includes: a pouch case preparing step of preparing the plate-shaped pouch case; a mold preparing step of preparing the mold having a battery cell accommodation space molding portion, a sealing portion molding portion, a pouch inclined surface molding portion and a tab welding surface molding portion, the tab welding surface molding portion being formed to have a predetermined curve; a pouch case molding step of pressing the plate-shaped pouch case into the mold in a shape of the mold to obtain an upper pouch and a lower pouch; a battery cell accommodating step of accommodating the battery cell in a battery cell accommodation space formed by coupling the upper pouch and the lower pouch to each other; a vacuum-compressing step of making the inside of the battery pouch in which the battery cell is accommodated into a vacuum state; and a sealing step of sealing a sealing portion of the upper pouch and a sealing portion of the lower pouch together to make the battery pouch to into a sealed state.

The tab welding surface of the battery pouch, molded to have the predetermined curve, may have a predetermined wrinkle by performing the vacuum-compressing step.

The predetermined curve of the tab welding surface may be formed in a shape of a curved or bent surface having a predetermined curvature.

The curved or bent surface of the tab welding surface may be formed in a fractal shape in which a curved or bent surface of a smaller pitch is repeated.

The pouch inclined surface molding portion may have a predetermined curve.

The pouch inclined surface of the battery pouch, molded to have the predetermined curve, may have a predetermined wrinkle by performing the vacuum-compressing step.

The predetermined curve of the pouch inclined surface may be formed in a shape of a curved or bent surface having a predetermined curvature.

The curved or bent surface of the pouch inclined surface may be formed in a fractal shape in which a curved or bent surface of a smaller pitch is repeated.

In another general aspect, a pouch case includes: a battery cell accommodation space accommodating a battery cell; a sealing portion formed by sealing the pouch case around an outer periphery of the battery cell accommodation space; a tab welding surface formed in a portion where a positive electrode tab and a negative electrode tab are disposed inside the sealing portion and the pouch case is not sealed; and a pouch inclined surface formed between the battery cell accommodation space and the tab welding surface, wherein the tab welding surface is molded to have a predetermined curve.

The predetermined curve of the tab welding surface may be formed in a shape of a curved or bent surface having a predetermined curvature.

The curved or bent surface of the tab welding surface may be formed in a fractal shape in which a curved or bent surface of a smaller pitch is repeated.

The pouch inclined surface may be molded to have a predetermined curve.

The predetermined curve of the pouch inclined surface may be formed in a shape of a curved or bent surface having a predetermined curvature.

The curved or bent surface of the pouch inclined surface may be formed in a fractal shape in which a curved or bent surface of a smaller pitch is repeated.

Other features and aspects are apparent from the following detailed description, the drawings and the claims.

DETAILED DESCRIPTION OF EMBODIMENTS

Hereinafter, embodiments of the present disclosure are described in detail with reference to the accompanying drawings.

Figures 1A, 1B:
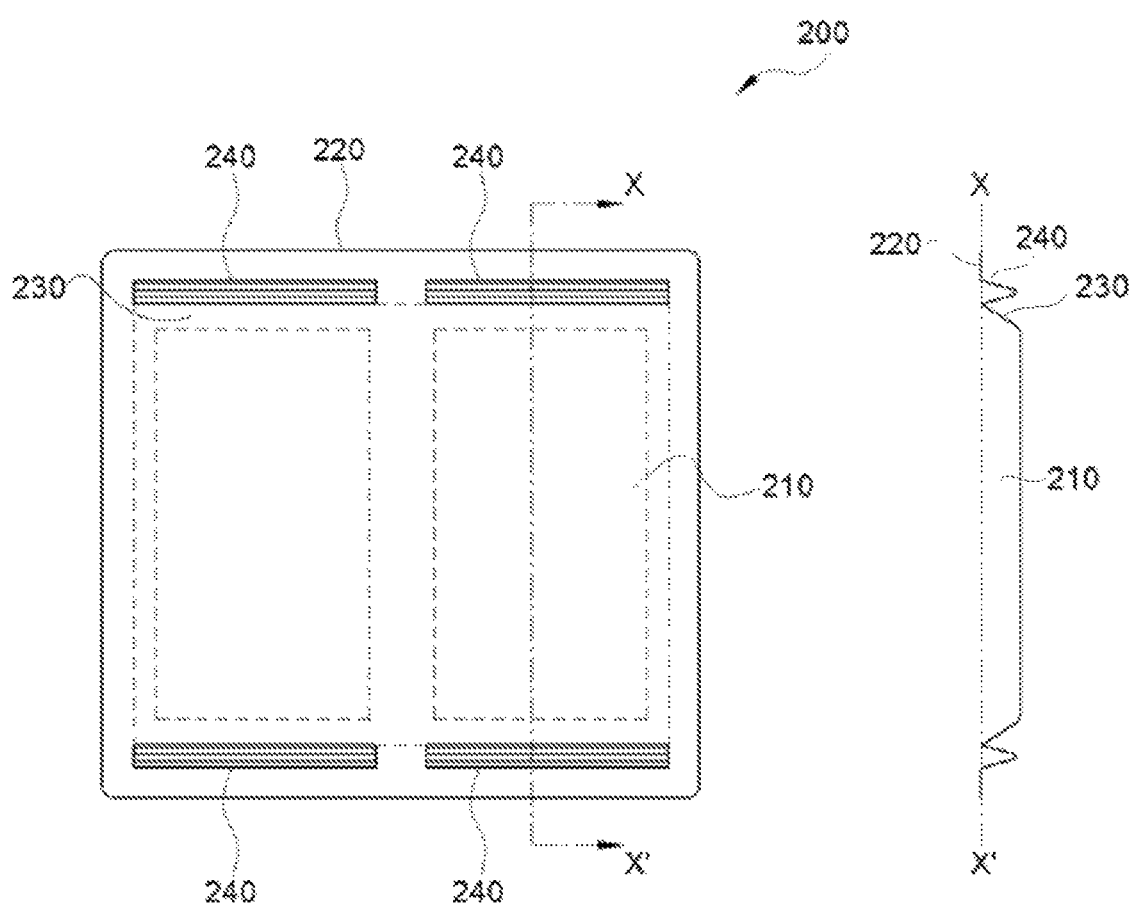
FIGS. 1A and 1B are plan views respectively showing a pouch case of the present disclosure.

FIGS. 1A and 1B are plan views respectively showing a state before a pouch case 200 of the present disclosure is sealed. A pouch type secondary battery 1000 of the present disclosure may be completed by disposing a battery cell C in the pouch case 200 having an inner space accommodating the battery cell C, folding the pouch case 200 in half, and then sealing surfaces of the pouch case in contact with each other together.

Here, the battery cell C of the present disclosure may include a jelly roll including a positive plate, a negative plate and a separator, and an electrode tab T including positive and negative electrode tabs. The pouch case 200 may include: a battery cell accommodation space 210 accommodating the battery cell C; a sealing portion 220 formed by sealing the pouch case 200 around an outer periphery of the battery cell accommodation space 210; a tab welding surface 240 formed in a portion where the positive electrode tab or the negative electrode tab is disposed inside the sealing portion 220 and the pouch case is not sealed; and a pouch inclined surface 230 formed between the battery cell accommodation space 210 and the tab welding surface 240. A tab film TF may be added to the portion where the sealing portion 220 and the electrode tab T are in contact with each other, and the tab welding surface 240 may be disposed in a tab welding portion TW where the electrode tab T is welded to the jelly roll.

When viewing cross sections of the battery cell accommodation space 210, the sealing portion 220, the pouch inclined surface 230 and the tab welding surface 240, of the pouch case 200, taken along the line X-X' of FIG. 1A, the battery cell accommodation space 210 may be formed to be concave to a predetermined depth, the pouch inclined surface 230 may connect the sealing portion 220 and a bottom of the battery cell accommodation space 210 at an angle with each other, and the tab welding surface 240 may be molded to have a predetermined depth like the battery cell accommodation space 210 and a predetermined curve, as shown in FIG. 1B. An additional gas collection portion capable of collecting and accommodating generated gas may be formed by molding the tab welding surface 240 to be concave to the predetermined depth as described above.

Figure 2:
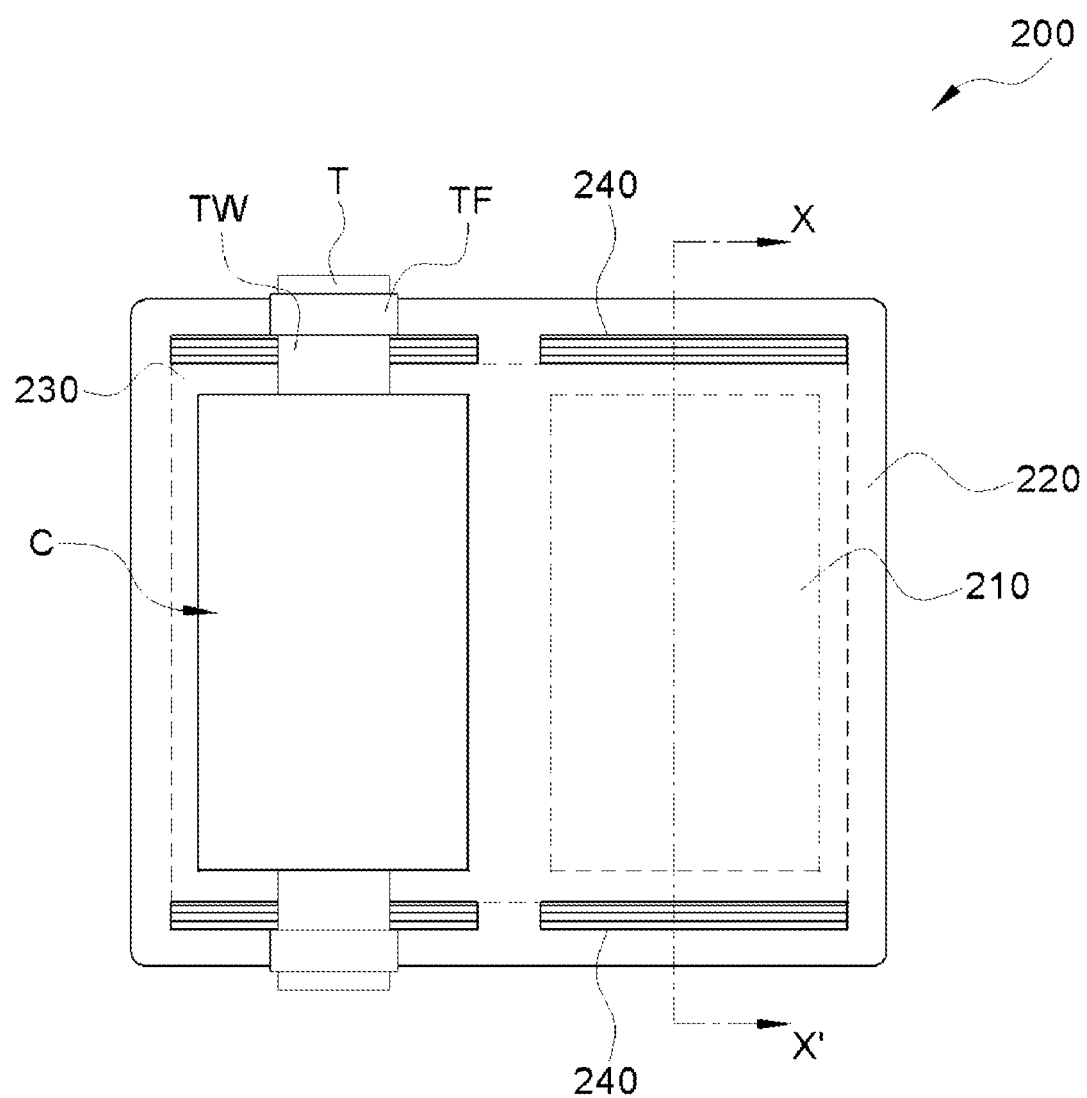
FIG. 2 is a plan view showing a state before the pouch case and electrode assembly of the present disclosure are sealed together.

FIG. 2 is a plan view showing a state before the pouch case and electrode assembly of the present disclosure are sealed together, and shows a state in which the battery cell is disposed on the pouch case described above. It is possible to protect the electrode tab T when the pouch case and electrode assembly of the present disclosure are sealed together by disposing the tab welding surface 240 of the pouch case in a position corresponding to the tab welding portion TW of the electrode tab T and disposing the tab film TF in a position corresponding to the sealing portion 220 of the pouch case. In this manner, the present disclosure may delay the occurrence of venting by collecting and accommodating the gas using an unsealed area at a rear end of the tab film TF disposed to protect the electrode tab T.

Figure 3:
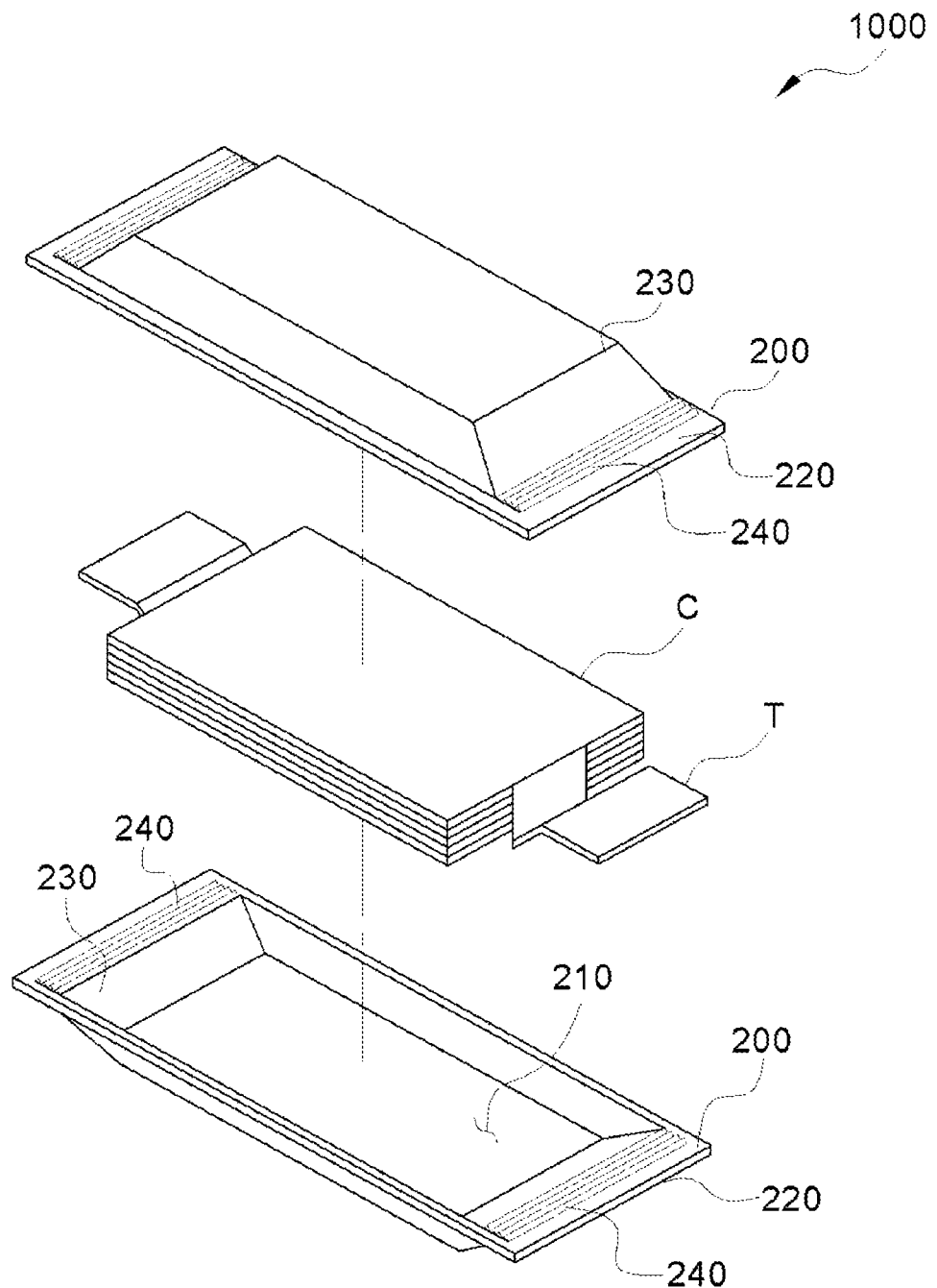
FIG. 3 is an exploded perspective view of a pouch type secondary battery of the present disclosure.

FIG. 3 is an exploded perspective view of a pouch type secondary battery of the present disclosure. Referring to FIG. 3, as described above, the pouch type secondary battery 1000 of the present disclosure may be formed to accommodate the battery cell C including the electrode tab T; the sealing portion 220 may be formed to seal the surfaces of the pouch case together, in which its upper and lower portions are in contact with each other; the pouch inclined surface 230 may be formed on a portion, in which the sealing portion 220 and the bottom of the battery cell accommodation space 210 are connected to each other, to correspond to a portion where the electrode tab T is extended to the outside; and the tab welding surface 240 may be disposed at one end of the pouch inclined surface 230. In a step of molding the tab welding surface 240, the tab welding surface 240 may be curved to the predetermined depth, and in a step of sealing the pouch case after the battery cell C is accommodated therein, the opposite surfaces of the pouch case may be maintained to be attached to each other in a state in which a wrinkle is formed thereon through vacuum compression, thereby forming a gas collection space collecting and accommodating the gas by spreading the wrinkle when the gas is generated in the battery cell C.

Figure 4A:
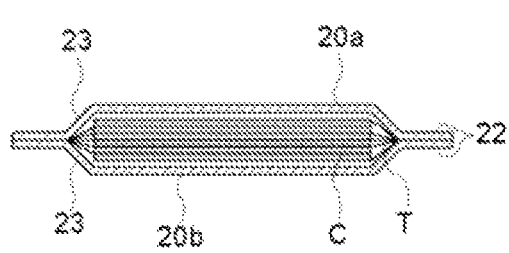
FIGS. 4A and 4B are cross-sectional views respectively showing states before and after venting occurs in a prior pouch type secondary battery.
Figure 4B:
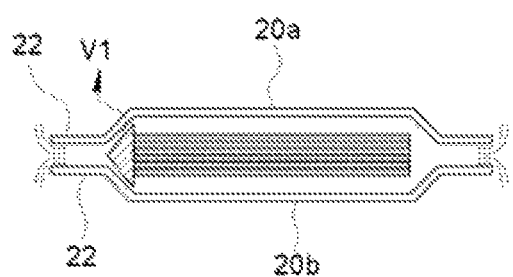

Next, the description describes a principle of the pouch type secondary battery 1000 of the present disclosure to delay the occurrence of venting with reference to FIGS. 4A to 5C. FIGS. 4A and 4B are cross-sectional views respectively showing states before and after venting occurs in a prior pouch type secondary battery. The prior pouch type secondary battery may have one battery pouch 20 formed by coupling an upper pouch 20a and a lower pouch 20b to each other, and a portion where the electrode tab T of the battery cell C is extended from and welded to the jelly roll in a space between a pouch inclined surface 23 of the upper pouch 20a and a pouch inclined surface 23 of the lower pouch 20b. Here, in the pouch case where the gas is generated in the battery cell C due to aging of the battery or the like, the gas may be gradually collected in the space between the pouch inclined surface 23 of the upper pouch 20a and the pouch inclined surface 23 of the lower pouch 20b, and when the pressure in the space is greater than or equal to its threshold, a venting phenomenon may occur in which the sealing of the battery pouch 20 is released.

Figure 5A:
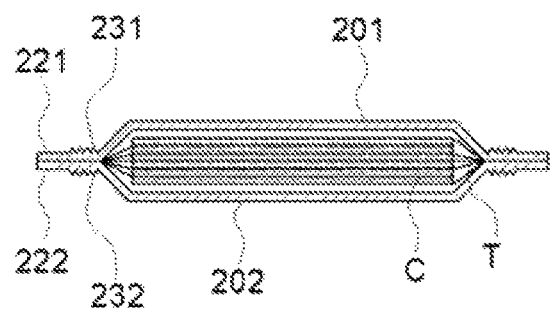
FIGS. 5A, 5B and 5C are cross-sectional views respectively showing states before, soon after, and a while after the venting occurs in a pouch type secondary battery of the present disclosure.
Figure 5B:
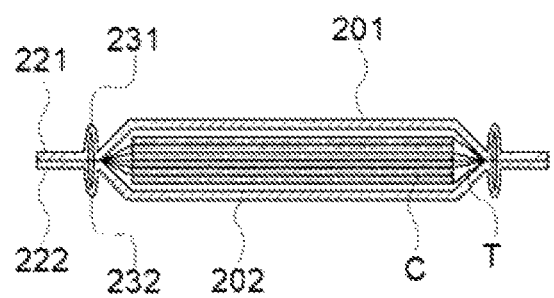
Figure 5C:
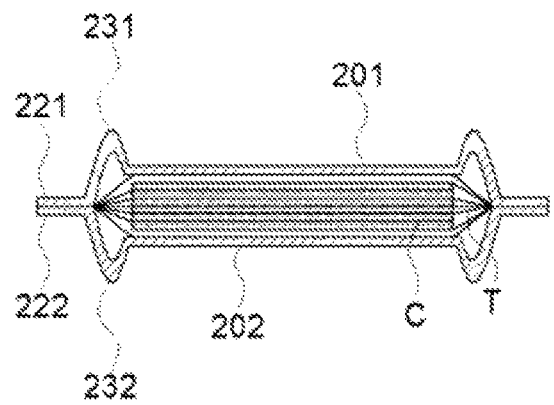

FIGS. 5A, 5B and 5C are cross-sectional views respectively showing states before, soon after, and a while after the venting occurs in a pouch type secondary battery 1000 of the present disclosure. The pouch type secondary battery 1000 of the present disclosure may have one battery pouch formed by coupling an upper pouch 201 and a lower pouch 202 to each other, and gas collection surfaces 231 and 232 formed by wrinkling the opposite surfaces of the upper pouch 201 and the lower pouch 202 through the vacuum compression. Unlike the prior pouch type secondary battery, when the gas is generated in the battery cell C in the pouch type secondary battery of the present disclosure, the tab welding surface 240 disposed on one end of the pouch inclined surface 230 and molded in advance to be curved to have a predetermined shape and depth may be unfolded first due to the pressure of the gas, and the unfolded space may thus form a space capable of collecting the generated gas. Accordingly, even if the gas is generated in the battery cell C, a larger amount of gas may be collected than in the prior art, thereby preventing or delaying the venting phenomenon of the battery pouch 200. Meanwhile, when more gas is generated late after the venting occurs, the tab welding surface 240 and the pouch inclined surface 230 may be spread together as shown in FIG. 5C, and the much larger amount of gas may thus be collected than in the prior art. Here, the pouch inclined surface 230 may also be formed in advance to have a curve of a predetermined shape and length, and the pouch inclined surface 230 may thus be formed to have more collection space. To form various types of curves on the pouch inclined surface 230 is described in more detail below.

Figure 6:
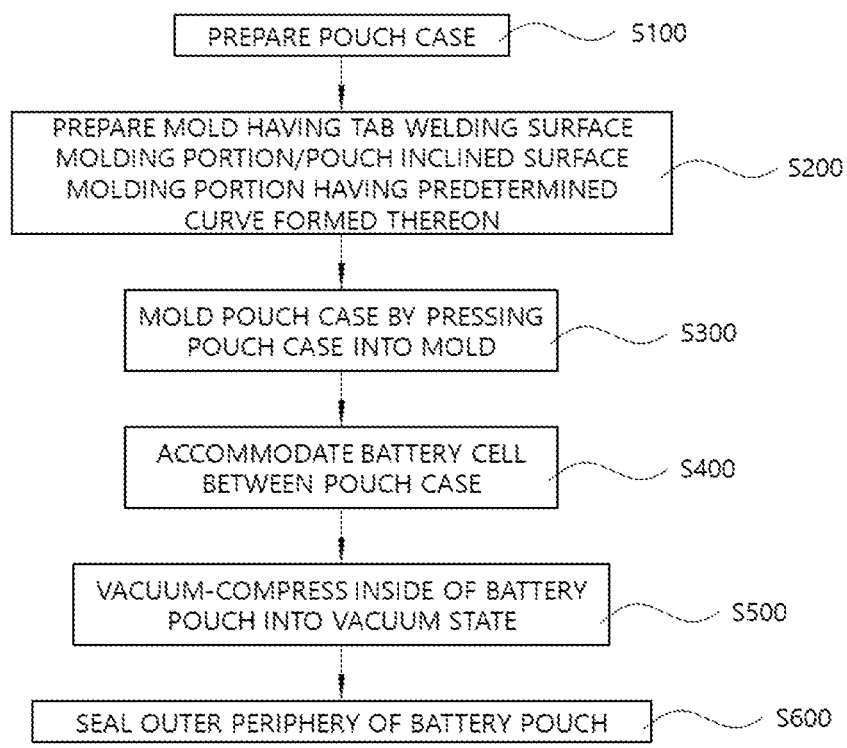
FIG. 6 is a flowchart showing a production method of a pouch type secondary battery according to the present disclosure.

FIG. 6 is a flowchart showing a production method of a pouch type secondary battery according to an embodiment of the present disclosure. As shown in FIG. 6, a pouch case preparing step (S100) may first be performed by preparing a plate-shaped pouch case 200.

Next, a mold preparing step (S200) may be performed by preparing the mold having a battery cell accommodation space molding portion 110, a sealing portion molding portion 120, a pouch inclined surface molding portion 130 and a tab welding surface molding portion 140. As described above, the pouch inclined surface molding portion 130 and/or the tab welding surface molding portion 140 may be curved, and here, the curve of the pouch inclined surface molding portion 130 and the tab welding surface molding portion 140 may be formed in a shape of a curved or bent surface.

A pouch case molding step (S300) may be performed by pressing the plate-shaped pouch case 200 into a mold 100 in a shape of the mold when the plate-shaped pouch case 200 and the mold 100 are prepared. The plate-shaped pouch case 200 molded in the molding of the pouch case (S300) may be an upper pouch 201 or a lower pouch 202, and one battery pouch may be formed by coupling the upper pouch 201 and the lower pouch 202 to each other.

Next, a battery cell accommodating step (S400) may be performed by accommodating a battery cell C in a battery cell accommodation space 210 formed by coupling the upper pouch 201 and the lower pouch 202 to each other, and a vacuum-compressing step (S500) may be performed by making a space between the upper pouch 201 and the lower pouch 202, i.e. the inside of the battery pouch, into a vacuum state. As described above, the pouch inclined surface 230 and/or the tab welding surface 240 of the present disclosure may be curved, have a longer surface length than a prior art, and thus be wrinkled when the inside of the battery pouch is in the vacuum state.

Finally, a sealing step (S600) may be performed by sealing a sealing portion 221 of the upper pouch 201 and a sealing portion 222 of the lower pouch 202 together to make the battery pouch into a sealed state. In this manner, a pouch type secondary battery 1000 of the present disclosure may be completed.

FIGS. 7A to 10B respectively show various embodiments of a mold and a molded pouch case for producing the pouch type secondary battery according to the present disclosure. FIGS. 7A to 10B show the types of curves formed on the pouch inclined surface 230 for convenience, but various types of curves may also be formed on the tab welding surface 240 by the same method.

Figure 7A:
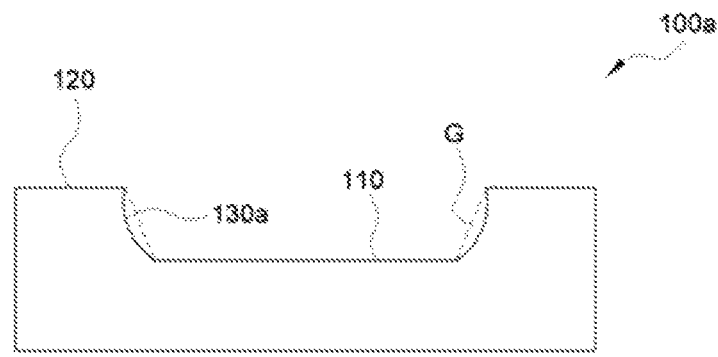
FIGS. 7A, 7B, 8A, 8B, 9A, 9B, 10A, and 10B are conceptual diagrams respectively showing various embodiments of a mold for producing a pouch case and a molded pouch case according to the present disclosure.
Figure 7A:
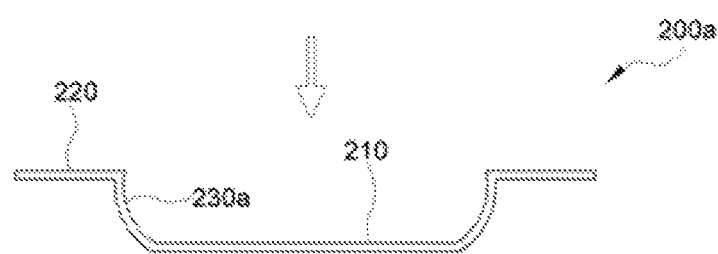

Referring to FIG. 7A, a mold 100a may include: a battery cell accommodation space molding portion 110 for accommodating a battery cell C; a sealing portion molding portion 120 for sealing a battery pouch 200a after the battery cell C is accommodated; and a pouch inclined surface molding portion 130a formed between an edge of the battery cell accommodation space molding portion 110 and an edge of the sealing portion molding portion 120. As described above, a prior mold inclined surface 13 is flat, however, the pouch inclined surface molding portion 130a of the present disclosure may be formed in a shape of a curved surface convex downward based on a reference surface G.

Accordingly, the plate-shaped pouch case 200 pressed into the mold 100a and molded in a shape of the mold may include: the sealing portion 220, the battery cell accommodation space 210, and a pouch inclined surface 230a formed between an edge of the sealing portion 220 and an edge of the battery cell accommodation space 210, and the pouch inclined surface 230a may be formed on the upper pouch 201 and the lower pouch 202, which form the battery pouch 200 together. Here, the pouch inclined surface 230a may also be molded in the shape of a curved surface convex downward like the pouch inclined surface molding portion 130a.

As described above, one battery pouch 200 may be formed by coupling the upper pouch 201 and the lower pouch 202 to each other, and a portion where each of the electrode tabs T of the battery cell C is extended from and welded to the jelly roll may be disposed in a space between the pouch inclined surface 231 of the upper pouch 201 and the pouch inclined surface 232 of the lower pouch 202, and when the gas is generated in the battery cell C, the gas may be collected in the space between the pouch inclined surface 231 of the upper pouch 201 and the pouch inclined surface 232 of the lower pouch 202. Therefore, when the gas is generated in the battery cell C, a larger amount of gas may be collected than in the prior art because the pouch inclined surface 230a of the present disclosure formed in the convex curved surface has a wider cross-sectional area than the flat pouch inclined surface 23 of the prior art, thereby preventing or delaying the venting phenomenon of the battery pouch 200a.

Figure 7B:
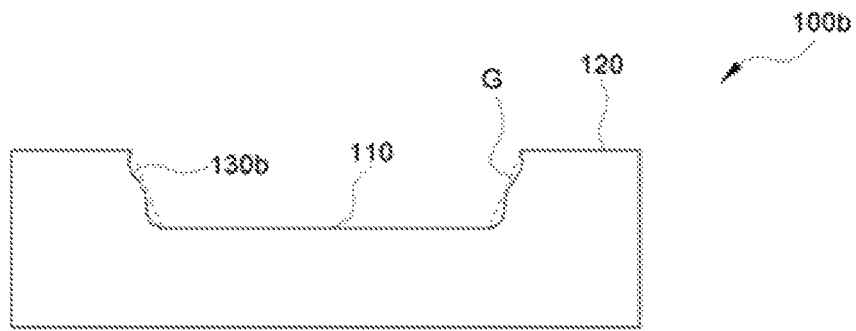
Figure 7B:
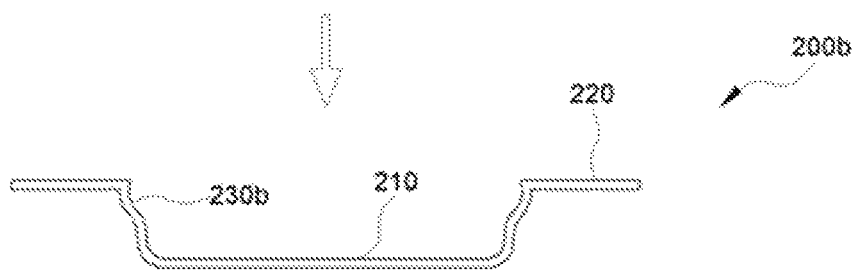

FIG. 7B shows that a pouch inclined surface molding portion 130b of a mold 100b is formed in a shape of a curved surface based on the reference surface G, and is formed in a waveform. Accordingly, a battery pouch 200b molded in a shape of the mold 100b may also may accommodate the larger amount of gas and delay the venting longer by having a pouch inclined surface 230b formed in the waveform and a longer length of the inclined surface.

Figure 8A:
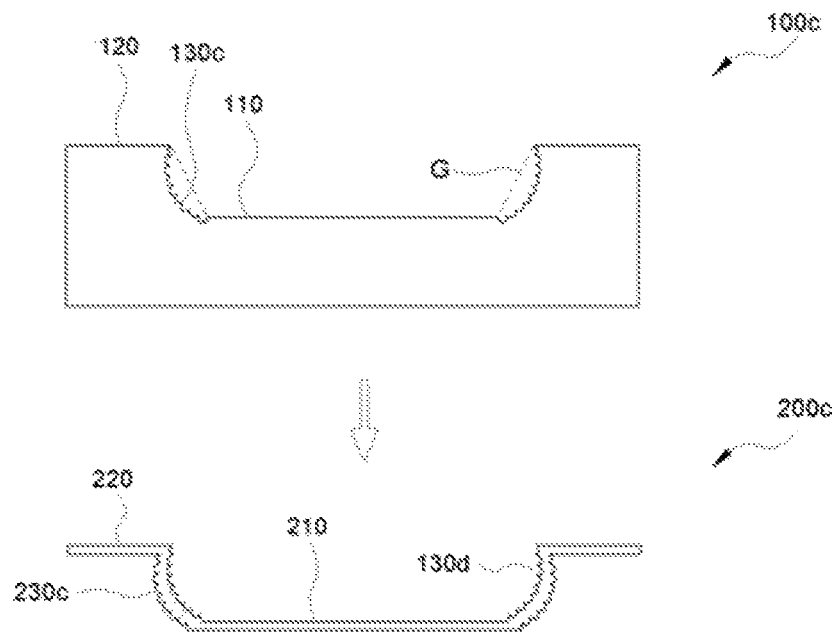
Figure 8B:
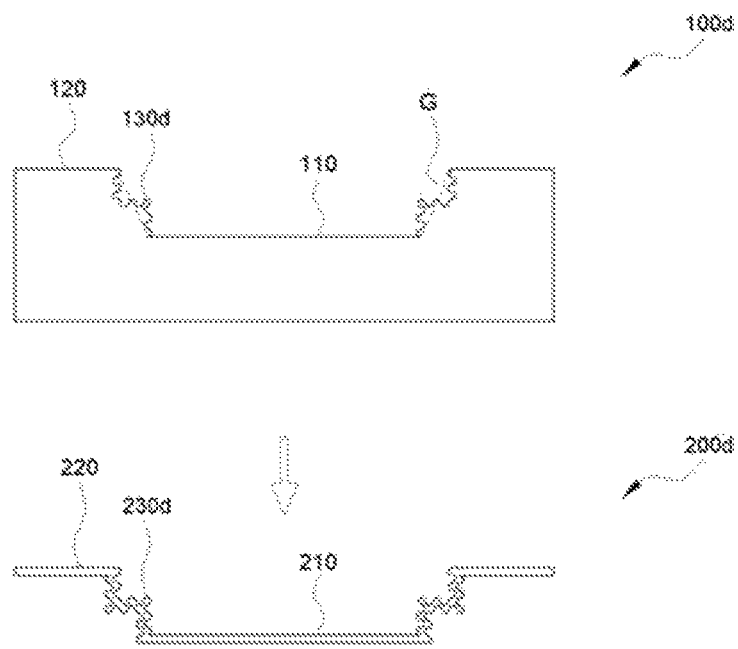

FIGS. 8A and 8B each show an embodiment in which a pouch inclined surface is formed in a curved surface, and a curved surface having a smaller curvature is formed on the curved surface. The inclined surface may be formed in a fractal structure having self-similarity, may form the fractal structure having geometrical self-similarity thereon, and may thus form a maximum collection space with a predetermined order in a condition of a complex irregular external force such as molding, vacuum compression and expansion.

FIG. 8A shows that a pouch inclined surface molding portion 130c of a mold 100c is formed in the shape of a curved surface convex downward based on the reference surface G, and the curved surface has a smaller curvature repeatedly formed thereon. FIG. 8B shows that a pouch inclined surface molding portion 130d of a mold 100d may be formed in a waveform, and may have a smaller curvature repeatedly formed thereon. Accordingly, battery pouches 200c and 200d respectively molded in shapes of the molds may have pouch inclined surfaces 230c and 230d each formed in the curved surface or the waveform, and the pouch inclined surfaces 230c and 230d may each have the smaller curvature repeatedly formed thereon.

Figure 9A:
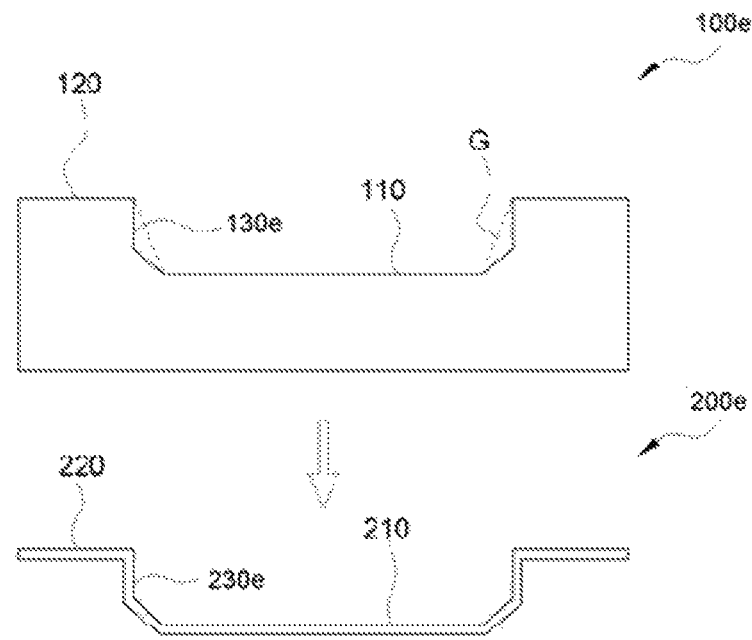
Figure 9B:
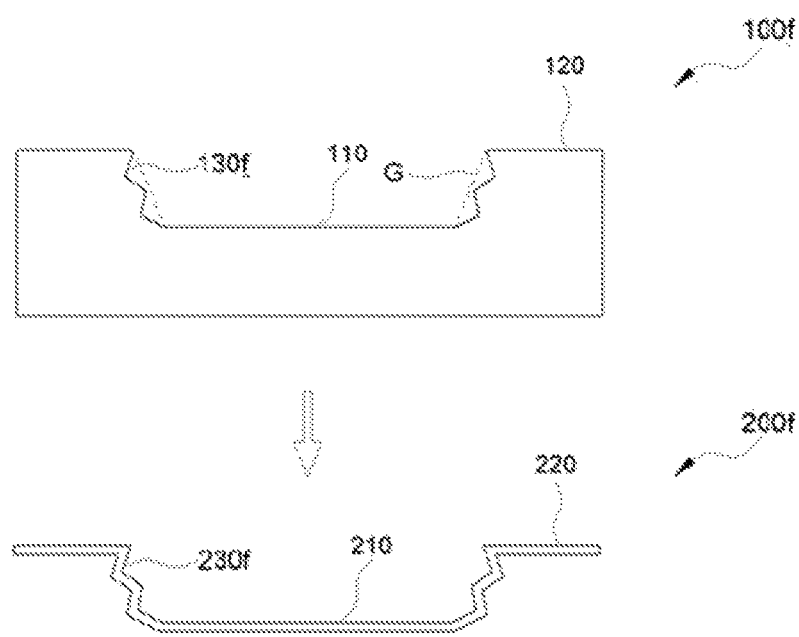

FIGS. 9A and 9B each show an embodiment in which the pouch inclined surface is formed in a bent surface. For example, a pouch inclined surface molding portion 130e may have a shape of a bent surface which is bent once as shown in FIG. 9A, and a pouch inclined surface molding portion 130f may have a shape of a bent surface which is bent twice as shown in FIG. 9B. Accordingly, battery pouches 200e and 200f respectively molded in shapes of the molds may have pouch inclined surfaces 230e and 230f, each of which is bent once or twice. As described above, when the pouch inclined surface is molded to be bent, it is possible to predict the shrinkage or expansion of the pouch inclined surface in advance in the condition of external force such as the molding, vacuum compression and expansion, and it is thus possible to more accurately design the position and volume of the gas collection portion. Meanwhile, the number of bent portions may be further increased as needed.

Figure 10A:
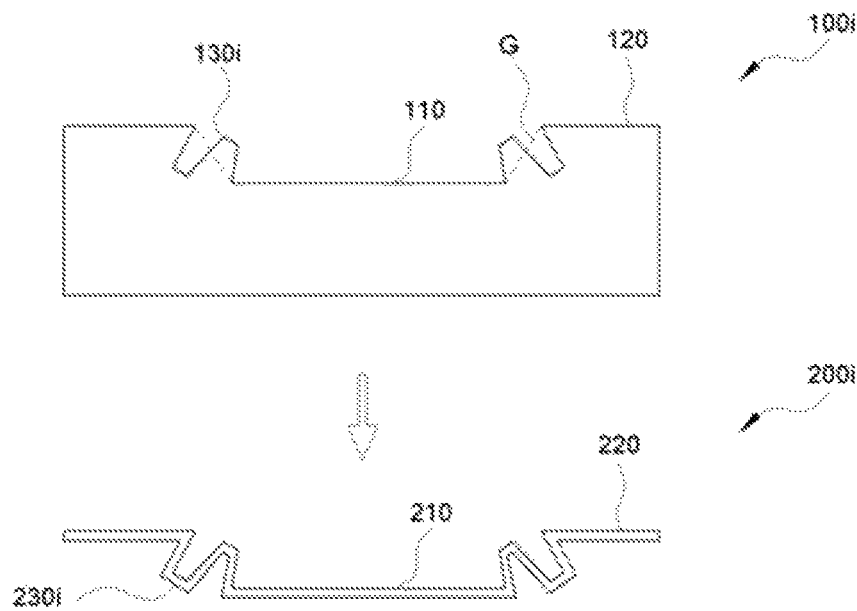
Figure 10B:
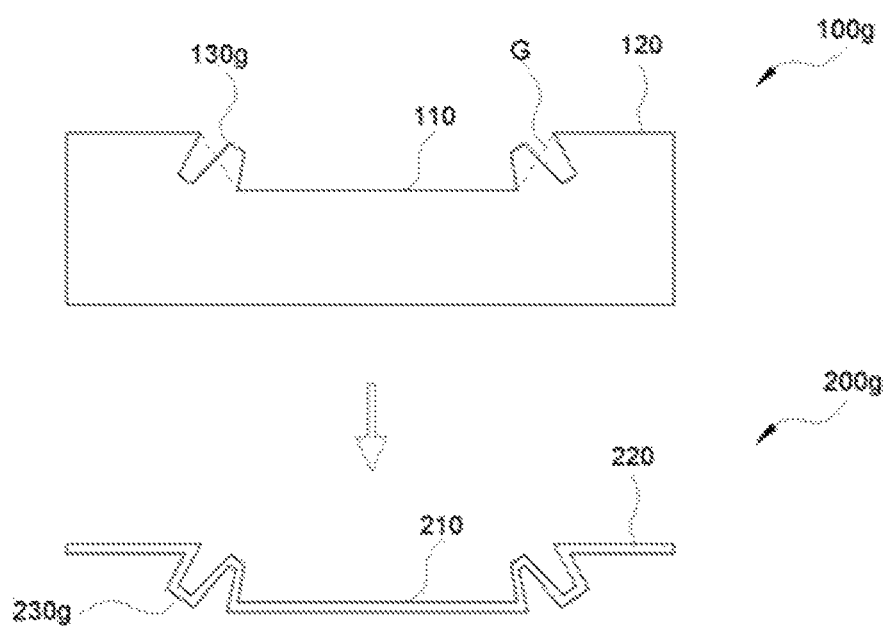

FIGS. 10A and 10B respectively show other embodiments in which a pouch inclined surface is formed in a bent surface. As shown in FIG. 10A, a pouch inclined surface molding portion 130i of a mold 100i may be formed to have bent portions respectively disposed above and below the reference surface G, in which each bent cross section of the bent portions may have a trapezoid shape instead of a triangular shape. Accordingly, a battery pouch 200i molded in a shape of the mold may have a pouch inclined surface 230i having bent cross sections each molded in the trapezoidal shape instead of the triangular shape, thereby securing more volume and extending the venting delay time when the pouch inclined surface is expanded.

In addition, as shown in FIG. 10B, the bent surface may also have a geometrical fractal structure, and a pouch inclined surface molding portion 130g of a mold 100g may be formed in a bent fractal structure. Accordingly, a pouch inclined surface 230g may have the bent fractal structure.

The pouch type secondary battery of the present disclosure adopting the above configuration may maximize the space in which the gas generated in the battery cell is collected by using the expandable collection space, thereby preventing the venting or delaying the occurrence time of the venting.

In addition, the present disclosure may collect the generated gas as much as possible through the shape of the curved surface, and may maintain the overall shape of the battery cell when the pouch is expanded by the gas.

The present disclosure is not to be construed as being limited to the above-mentioned embodiments. The present disclosure may be applied to various fields and may be variously modified by those skilled in the art without departing from the scope of the present disclosure claimed in the claims. Therefore, it is obvious to those skilled in the art that these alterations and modifications fall in the scope of the present disclosure.

What is claimed is:

1. A pouch type secondary battery comprising:
   a battery cell including a positive plate, a negative plate, a separator, and positive and negative electrode tabs that protrude; and
   a pouch case having the battery cell disposed therein, wherein the pouch case includes:
   a battery cell accommodation space accommodating the battery cell;
   a sealing portion formed by sealing the pouch case around an outer periphery of the battery cell accommodation space;
   a tab welding surface formed in a portion where the positive electrode tab and the negative electrode tab are disposed inside the sealing portion and the pouch case is not sealed; and
   a pouch inclined surface formed between the battery cell accommodation space and the tab welding surface,
   wherein a wrinkle having a corrugated shape is formed on the tab welding surface, the wrinkle extending along a direction where the positive and negative electrode tabs protrude, and
   wherein the tab welding surface is configured to form a gas collection space collecting and accommodating gas by spreading the wrinkle formed on the tab welding surface in a perpendicular direction where the positive and negative electrode tabs protrude when the gas is generated in the battery cell, and thereby configured to prevent or delay a venting phenomenon of the battery pouch.

2. The pouch type secondary battery of claim 1, wherein the wrinkle of the tab welding surface is formed in a shape of a curved or bent surface having a predetermined curvature.

3. The pouch type secondary battery of claim 2, wherein the curved or bent surface of the tab welding surface is formed in a fractal shape in which a curved or bent surface of a smaller pitch is repeated.

4. The pouch type secondary battery of claim 1, wherein the pouch inclined surface is wrinkled by being molded to have a predetermined curve.

5. The pouch type secondary battery of claim 4, wherein the predetermined curve of the pouch inclined surface is formed in a shape of a curved or bent surface having a predetermined curvature.

6. The pouch type secondary battery of claim 5, wherein the curved or bent surface of the pouch inclined surface is formed in a fractal shape in which a curved or bent surface of a smaller pitch is repeated.

7. A pouch case comprising:
a battery cell accommodation space accommodating a battery cell;
a sealing portion formed by sealing the pouch case around an outer periphery of the battery cell accommodation space;
a tab welding surface formed in a portion where a positive electrode tab and a negative electrode tab are disposed inside the sealing portion and the pouch case is not sealed; and
a pouch inclined surface formed between the battery cell accommodation space and the tab welding surface,
wherein a wrinkle having a corrugated shape is formed on the tab welding surface, the wrinkle extending along a direction where the positive and negative electrode tabs protrude, and
wherein the tab welding surface is configured to form a gas collection space collecting and accommodating gas by spreading the wrinkle formed on the tab welding surface in a perpendicular direction where the positive and negative electrode tabs protrude when the gas is generated in the battery cell, and thereby configured to prevent or delay a venting phenomenon of the battery pouch.

8. The pouch case of claim 7, wherein the wrinkle of the tab welding surface is formed in a shape of a curved or bent surface having a predetermined curvature.

9. The pouch case of claim 8, wherein the curved or bent surface of the tab welding surface is formed in a fractal shape in which a curved or bent surface of a smaller pitch is repeated.

10. The pouch case of claim 7, wherein the pouch inclined surface is molded to have a predetermined curve.

11. The pouch case of claim 10, wherein the predetermined curve of the pouch inclined surface is formed in a shape of a curved or bent surface having a predetermined curvature.

12. The pouch case of claim 11, wherein the curved or bent surface of the pouch inclined surface is formed in a fractal shape in which a curved or bent surface of a smaller pitch is repeated.

* * * * *